United States Patent [19]

Pilatzki

[11] 4,368,454
[45] Jan. 11, 1983

[54] STEERING DEVICE WITH DISHED IMPACT PLATE FOR AUTOMOTIVE VEHICLES

[76] Inventor: Bernd Pilatzki, Wuellnerstr. 115, 5000 Cologne 41, Fed. Rep. of Germany

[21] Appl. No.: 194,246

[22] PCT Filed: Sep. 26, 1979

[86] PCT No.: PCT/EP79/00075
§ 371 Date: May 27, 1980
§ 102(e) Date: May 13, 1980

[87] PCT Pub. No.: WO80/00683
PCT Pub. Date: Apr. 17, 1980

[30] Foreign Application Priority Data
Sep. 27, 1978 [DE] Fed. Rep. of Germany ....... 2842020

[51] Int. Cl.³ .......................... G08G 1/00; G05G 11/00
[52] U.S. Cl. .................................... 340/22; 74/484 R; 74/552; 180/78
[58] Field of Search ................ 340/22; 74/552, 484 R, 74/492, 496, 497; 180/78

[56] References Cited
U.S. PATENT DOCUMENTS

| 1,769,517 | 7/1930 | Ivandick | 74/552 |
| 1,795,566 | 3/1931 | MacComb | 180/78 |
| 1,944,905 | 1/1934 | Rowell | 180/78 |
| 2,465,825 | 3/1949 | Tucker et al. | 180/78 |
| 2,622,690 | 12/1952 | Barenyi | 74/552 |
| 2,699,034 | 1/1955 | Maire | 74/484 R |

FOREIGN PATENT DOCUMENTS

| 2131902 | 12/1972 | Fed. Rep. of Germany . |
| 1008094 | 2/1952 | France . |
| 1044970 | 6/1953 | France . |
| 1439225 | 4/1966 | France . |
| 1440124 | 4/1966 | France . |
| 55-110660 | 8/1980 | Japan .................................. 74/484 R |
| 205050 | 8/1939 | Switzerland . |

*Primary Examiner*—James J. Groody
*Attorney, Agent, or Firm*—Michael J. Striker

[57] ABSTRACT

A steering device for a vehicle comprises a steering wheel having one spoke and supported by a steering shaft, a shock proof dished plate carrying operating controls, indicating instruments on an outer surface of the plate facing a driver of the vehicle and a construction element immovably attached to the vehicle. The steering device is provided with two displaceable coupling elements which couple the dished plate to the construction element so that when one of the coupling elements is in its coupling position by engaging in one of the passages formed in the dished plate, the other coupling element is allowed to come out from its coupling position by disengaging out of another one of the passages of the dished plate to thus prevent the dished plate from rotating with the steering wheel.

15 Claims, 5 Drawing Figures

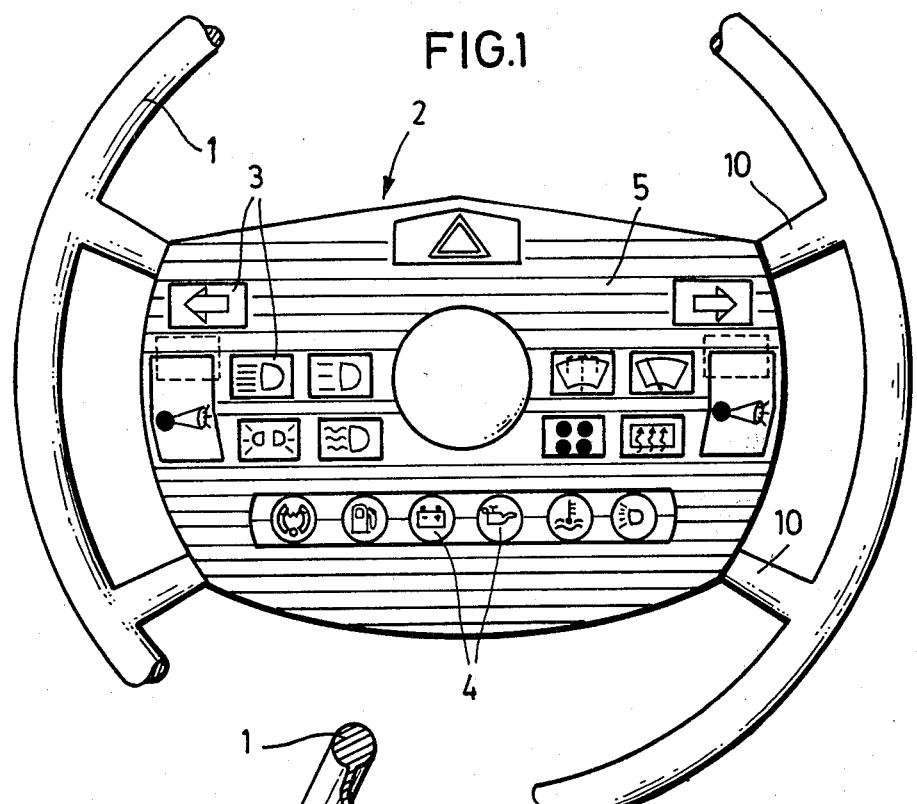
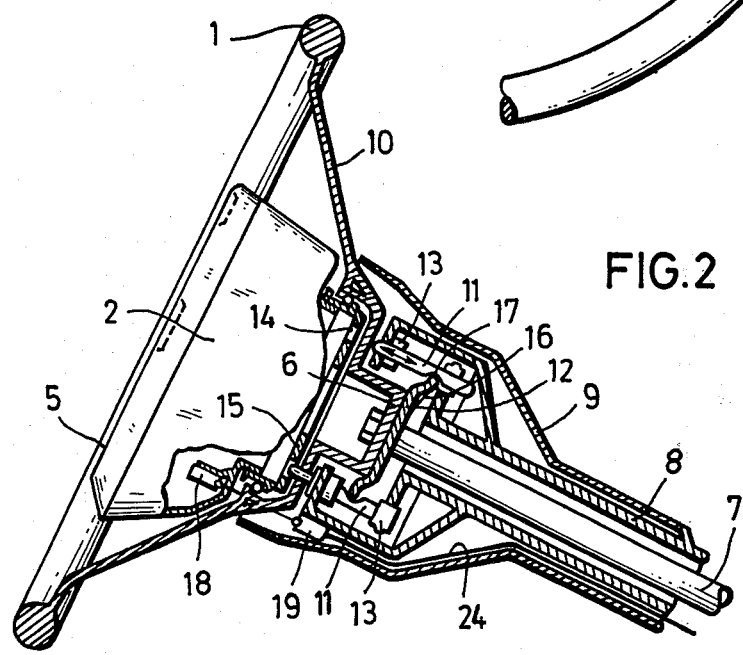

STEERING DEVICE WITH DISHED IMPACT PLATE FOR AUTOMOTIVE VEHICLES

BACKGROUND OF THE INVENTION

The invention refers to a steering device having a steering wheel supported by a steering shaft, and a dished impact plate in which provision is made for respectively indicating instruments and operating controls, with the impact plate, arranged stationary within the steering wheel and also, as seen by the driver, before the spokes.

A steering device of this type is known from the DE letter of disclosure No. 21 31 902. In this known device, the dished impact plate is fixedly connected to a non-rotating component immovably fixed in the vehicle, and the steering wheel is coupled over planetary gears with the steering shaft. This known steering device has the advantage that the dished impact plate with its indicating instruments and operating controls will always remain stationary in the vehicle and will not turn with the steering wheel; it is, however, of the grave disadvantage that technical expenditure is relatively high and that the requisite operating safety is not ensured. The occurrence of defects, particularly in the planetary gears, cannot be excluded herein.

SUMMARY OF THE INVENTION

The present invention is based on the objective of creating a steering device which will avoid the disadvantages of the known steering device and which, despite its moderate technical expenditure will be safe in operation to a high degree and which will be simple to install.

As per invention, this objective is attained by fixedly attaching the steering wheel to the steering shaft and provision of a dished impact plate linked to a component stationarily installed in the vehicle by means of at least two movable coupling elements, the latter being movable by a control component connected to the steering wheel so that least one coupling element is in arresting position whilst another coupling element is displaced from the arresting position to allow the passing of a steering wheel spoke.

In the device as per invention, the steering wheel will allways be rigidly connected to the steering shaft by its spokes. The dished impact plate supported in the steering wheel will, however, not turn with the steering wheel since one of the coupling elements will hold the dished impact plate stationary relative to a component which is stationarily installed in the vehicle, so that the former is thus being held stationary.

The coupling elements will preferably be components engaging recesses, such as pins, bolts, spheres, latches etc., guided so they may slide or pivot, and movable by the steering component connected to the steering shaft. Instead of components in positive engagement, elements may also be used that effect coupling by friction. The spokes of the steering wheel may also serve as control component so that upon passing of a spoke the spoke itself will directly withdraw the coupling element from its engaged position and the latter will, after passing of the spoke, be pressed back into its engaged position by, for instance, a spring.

The slidable or pivotable coupling elements may be located in the dished impact plate or also in a component immovably mounted in the vehicle. The coupling elements may be pressed by springs against the cam curve of a control component which, on passing of a spoke, will press the coupling elements against the force of a spring and out of their arresting position.

The coupling elements may, however, also be moved by control elements which will move the coupling elements into the arresting position as well as into the unlatching position. In this instance the coupling elements will be engaged by the cam curve of the control component, for instance the outer perimeter of a cam plate.

Although the movable coupling elements and their guide and control components may be so designed that defects will not occur, it may be appropriate to design these components so that the coupling elements will be pressed away by the spokes of the steering wheel in case they had not been moved into the unlatching position by the control components.

Since in the steering device as per invention the steering wheel remains fixedly attached to the steering shaft, this device may also be installed at moderate expense in already existing vehicles. Transmitting of information for the indicating instruments and, or, respectively, the operating controls will advantageously be made wireless. For this reason, electronic transmitting and electronic receiving units as installed in the dished impact plate on one hand, and on the other on a component immovable in the vehicle, serving for the transmission of information either by electro-magnetic means or by light or sound waves. A printed circuit may be installed at the back of the elastic or resilient impact wall, for connecting the indicating instruments, operating controls and, respectively, sensors, mounted in the impact wall with the electronic transmitting and receiving unit installed in the dished impact plate.

Transmitting of information may, however, also ensue by means of slip rings or the like, particularly also by using pulse-controlled transmitting and receiving apparatus.

Embodiments of the invention are explained below in more detail by referring to the drawings.

BRIEF DESCRIPTION OF THE DRAWINGS

FIG. 1 a top view of a steering wheel with a dished impact plate;

FIG. 2 a sectional view of the steering device as per invention; and

DETAILED DESCRIPTION OF THE PREFERRED EMBODIMENTS

Figure 3:
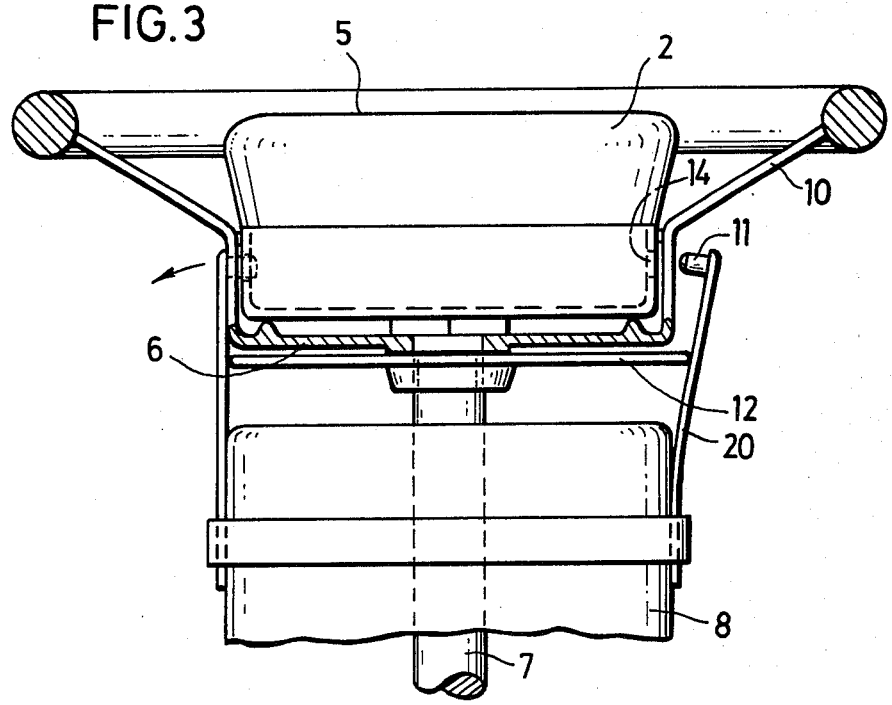
FIGS. 3, 4, and 5 are various embodiments of coupling elements and their control components.

In the steering device as per FIGS. 1 and 2, a dished impact plate is arranged in the steering wheel with the side facing the driver being provided with operating elements 3 and indicating instruments 4 set into an impact wall 5. The impact wall 5 consists of a resilient material and the dished impact plate 2 is filled with padding material.

The operating controls 3, serving, for instance, to operate the lights, the horn, the windshield wiper, the directional indicator, and the like, may be designed as sensor keys and will require only little space.

The dished impact plate 2 is supported on the steering wheel hub and held thereon by means of antifriction or friction bearings. The steering wheel hub 6 is rigidly joined to the steering shaft 7 which, on its part, is rotatably supported within the steering column 8. A casing 9 encloses the steering wheel hub 6 and the upper portion of the steering shaft 7 and the steering column 8.

The steering wheel hub 6 is connected over spokes 10 to the steering wheel 1. In order to prevent the dished impact plate 2 to corotate when the steering wheel 1 is being turned, movable coupling elements 11, coupling the dished impact plate 2 to a part immovably attached in the vehicle, namely the steering column 8, will serve to arrest the dished impact plate in this instance. The coupling elements 11 are designed in FIG. 2 as displaceable pins or bolts, displaceably guided within guides 13 and moved by an axially operating control disc 12 into the unlatching position and also into the arresting position. In FIG. 2, the lower coupling pin 11 is in its arresting or coupling position. It will herein engage a recess 14 located at the bottom of the dished impact plate 2. The upper coupling pin 11 is however axially displaced by the cam curve 16 of the control disc 12 for such a distance that it will clear the path for the passage of the upper spoke 10. The movable coupling elements 11 are radially offset relative to the spokes 10 in such a manner that one coupling element 11 will always be in coupling position. The pin-shaped coupling element 11, essentially movable axially to the steering shaft 7, will be moved by the control disc 12 into the coupling position as well as into the disengaged position. It is for this purpose that the cam curve 16 at the perimeter of the control disc 12 will engage recesses 17 of the coupling element.

It is, however, also possible to have the coupling element 11 abut a curved disc at only one side if these coupling elements are loaded by return springs which will press the coupling elements against the cam curve of the control disc 12.

As shown in FIG. 2, transmitting and receiving electronics 18 are arranged in the dished impact plate 2, operating in conjunction with transmitting and receiving electronics 19 arranged near the dished impact plate 2 on a component 8 stationarily attached to the vehicle. It is possible in this manner to obtain a wireless connection of the operating control 3 and the indicating instruments 4 and the electrical users and measuring points. In consequence of this wireless transmitting of information, the expenditure for installing the dished impact plate in the steering wheel will be moderate.

The operating controls 3 and the indicating instruments 4 may also be connected to the receiving and transmitting electronics 18 in the dished impact plate 2 by means of a printed circuit arranged on the rear of the impact wall 5. The transmitting and receiving electronics 19 on the component 8, stationarily attached to the vehicle, are connected by a wiring harness 24 to the various electrical users and measuring points.

In the embodiment as per FIG. 3, the coupling elements 11 are arranged at the free ends of swivelling brackets 20 mounted on the component 8 stationarily attached to the vehicle. Return springs are holding the coupling elements 11 in the coupling position. Since in the embodiment as per FIG. 3, leaf springs constitute the brackets 20, no need exists for additional spring to hold the coupling elements 11 in the coupling position. A control disc 12 is mounted on the steering shaft 7 and will radially press the swivelling brackets 20 outward when a spoke 10 is passing a coupling point. Instead of the control disc 12, cams may also be attached to to the steering wheel hub 6 and will, upon passing of the spokes, move the coupling elements into the unlatching position.

Figure 4:
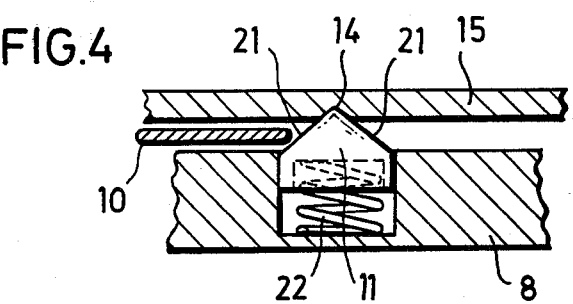

In the embodiment as per FIG. 4, the coupling elements 11 are provided with abutting inclines 21 projecting into the zone of motion of the spokes 10. In the coupling position shown, a spring 22 will press the coupling elements 11 into a groovelike recess 14 provided in the bottom 15 of the dished impact plate 2. When a spoke 10 is to pass this coupling point, this spoke 10 will press onto an abutting incline 21 of the coupling elements 11 and will, against the effect of the spring 22, press the coupling elements 11 into the released position. The coupling elements 11 may be arranged on the component 8 stationarily attached to the vehicle, or also in the dished impact plate 2. Instead of a positive engagement of the coupling elements 11, frictional engagement may also be provided for the coupling elements 11. The coupling elements 11 may also act conjointly with opposite surfaces that are elastic or that have been knurled or roughened in some other way.

Figure 5:
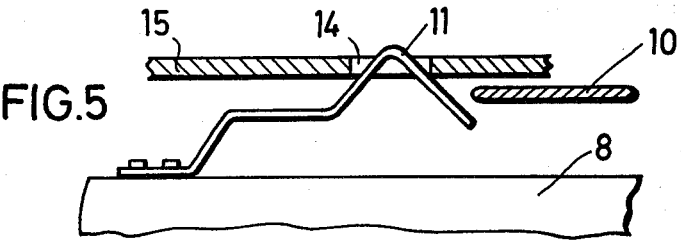

In the embodiment as per FIG. 5, an arcuate leaf spring constitutes the coupling element 11, the return spring, the abutting incline 21 and the pivotable bracket, the leaf spring automatically positioning itself into the arresting position and being pressed out of its coupling position by the spoke 10 of the steering wheel 1.

I claim:

1. A steering device for a vehicle, comprising a steering wheel supported by a steering shaft; a shock proof dished plate carrying operating controls, indicating instruments or the like on an outer surface thereof facing a driver of the vehicle, the steering wheel having at least one spoke being rigidly connected to said steering shaft; a construction element immovably attached to the vehicle, said dished plate being formed with passages; and at least two displaceable coupling elements adapted to couple said dished plate to said construction element so that when one of said coupling elements is in its coupling position by engaging thereof in one of said passages the other coupling element is allowed to come out of its coupling position by disengaging thereof out of another of said passages to thereby prevent said dished plate from rotating with said steering wheel.

2. The steering device of claim 1, wherein said displaceable coupling elements allow for coupling by a positive engagement of said elements with the respective passages.

3. The steering device of claim 1, wherein said displaceable coupling elements allow for coupling by a positive engagement and partially frictional engagement of said elements with the respective passages.

4. The steering device of claim 3, further including a control member linked to said steering wheel and adapted to selectively move said coupling elements so as to engage or disengage said coupling elements with the respective passages.

5. The steering device of claim 4, wherein said control member includes cam curves.

6. The steering device of claim 4, wherein said coupling elements are provided with inclined surfaces which in said coupling position project into a zone of motion of said spoke and act cojointly with the latter so that the respective coupling element will come out of its coupling position upon the passing of said spoke.

7. The steering device of claim 5, wherein said cam curves are in a positive engagement with said coupling elements.

8. The steering device of claim 1, wherein said coupling elements are arranged on said dished plate.

9. The steering device of claim 7, wherein said coupling elements are pins.

10. The steering device of claim 6, wherein said coupling elements are pins.

11. The steering device of claim 4, wherein said coupling elements are leaf springs.

12. The steering device of claim 4, further including transmitting and receiving electronic members, arranged on said dished plate and adapted to electrically connect said operating controls and indicating instruments with corresponding receiving electronic members stationary arranged in the vehicle near said dished plate.

13. The steering device of claim of claim 4, wherein said coupling elements are swivelling brackets having end portions mounted to said construction element and terminated with pins selectively engageable or disengageable with the respective passages.

14. The steering device of claim 10, wherein said passages are formed as groove-like recesses.

15. The steering device of claim 14, including springs for pressing said coupling elements into said recesses.

* * * * *